United States Patent
Miettinen (10) Patent No.: US 7,352,999 B2
(45) Date of Patent: Apr. 1, 2008

(54) TERMINAL, METHOD AND COMPUTER PROGRAM PRODUCT FOR INTERACTING WITH A SERVICE PROVIDER VIA A SIGNALING TAG

(75) Inventor: Timo K. Miettinen, Espoo (FI)

(73) Assignee: Nokia Corporation, Espoo (FI)

( * ) Notice: Subject to any disclaimer, the term of this patent is extended or adjusted under 35 U.S.C. 154(b) by 225 days.

(21) Appl. No.: 10/767,586

(22) Filed: Jan. 29, 2004

(65) Prior Publication Data

US 2005/0173509 A1    Aug. 11, 2005

(51) Int. Cl.
*H04B 7/20*    (2006.01)
(52) U.S. Cl. ............. 455/41.2; 455/557; 455/412.1; 455/414.1
(58) Field of Classification Search ........... 455/556.1, 455/419, 564, 151.2, 557, 41.2, 446, 426.1; 340/505, 572.1, 10.1, 10.3
See application file for complete search history.

(56) References Cited

U.S. PATENT DOCUMENTS

| | | | |
|---|---|---|---|
| 2002/0087656 A1* | 7/2002 | Gargiulo et al. ............ 709/217 |
| 2002/0116268 A1* | 8/2002 | Fukuda ........................ 705/14 |
| 2004/0110474 A1* | 6/2004 | Yonekura et al. ............. 455/74 |
| 2004/0171373 A1* | 9/2004 | Suda et al. .................. 455/415 |
| 2004/0220995 A1* | 11/2004 | Tsutsumi ................... 709/200 |
| 2005/0104719 A1* | 5/2005 | Ramamurthy et al. ..... 340/10.1 |
| 2005/0125561 A1* | 6/2005 | Miyaji ....................... 709/249 |
| 2005/0134449 A1* | 6/2005 | Barile et al. ................ 340/505 |
| 2005/0258955 A1* | 11/2005 | Gloekler et al. ....... 340/539.13 |

FOREIGN PATENT DOCUMENTS

| | | |
|---|---|---|
| EP | 0986020 A2 | 3/2000 |
| EP | 0986020 A3 | 3/2000 |
| EP | 1191488 A1 | 3/2002 |
| EP | 1244043 A2 | 9/2002 |
| WO | WO 99/17230 | 4/1999 |
| WO | WO 01/50224 A2 | 7/2001 |
| WO | WO 01/73687 A2 | 10/2001 |
| WO | WO 2004040793 A1 | 5/2004 |
| WO | WO 2004074965 A2 | 9/2004 |
| WO | WO 2005038678 A2 | 4/2005 |
| WO | WO 2005038678 A3 | 4/2005 |

* cited by examiner

*Primary Examiner*—Duc M. Nguyen
*Assistant Examiner*—Dai Phuong
(74) *Attorney, Agent, or Firm*—Alston & Bird LLP (57) ABSTRACT

A terminal for interacting with a service provider via signaling tag includes a controller capable of actively operating an application. The controller is also capable of receiving information regarding a signaling tag, including information relating to a service type, at least partially over an air interface. Then, the controller is capable of accessing the service. Thereafter, the controller is capable of performing a predefined action, such as downloading data from the service and/or uploading data to the service, based upon the information relating to the service type, the application actively operating on the terminal and a state of the application.

26 Claims, 4 Drawing Sheets

TERMINAL, METHOD AND COMPUTER PROGRAM PRODUCT FOR INTERACTING WITH A SERVICE PROVIDER VIA A SIGNALING TAG

FIELD OF THE INVENTION

The present invention generally relates to systems and methods of interacting with entities and, more particularly, relates to terminals, methods and computer program products for interacting with a signaling tag in a short-range environment to interact with a service provider.

BACKGROUND OF THE INVENTION

Where mobile telephones were perhaps viewed by many as a luxury when first introduced into the marketplace, they are today viewed by our society as very important, convenient, and useful tools. A great number of people now carry their mobile devices with them wherever they go. This popularity of wireless communication has spawned a multitude of new wireless systems, devices, protocols, etc. Consumer demand for advanced wireless functions and capabilities has also fueled a wide range of technological advances in the utility and capabilities of wireless devices. Wireless/mobile devices not only allow voice communication, but also facilitate messaging, multimedia communications, e-mail, Internet browsing, and access to a wide range of wireless applications and services.

An incredible amount of content, applications, services, etc. is already available for use on wireless devices. However, the quantity of information that will be accessible to mobile terminals will increase significantly in the coming years, as further technological advances will continue to diminish the gap between desktop and wireless units. While access to this plethora of information is exciting to the mobile world, locating the desired information and utilizing the various access methods can become burdensome to the casual mobile terminal user. In fact, current mobile data services have taken off relatively slowly, partly due to the inconvenient and complex service discovery solutions offered for users of existing mobile phones.

Current mobile data service discovery and initiation has been accomplished in a variety of ways. Browsing using the Wireless Application Protocol (WAP) generally involves starting from an operator preset service portal, and browsing forward by clicking various menus. Other current mobile data service discovery includes searching for the information required for sending messages, such as short messaging service (SMS) messages, from various sources such as advertisements. For example, users may be required to search advertisements to find content strings and application numbers. Another existing service discovery method involves mobile terminal configuration settings. Currently, this is often performed by initiating the configuration from a web site or requesting it personally.

Whereas conventional techniques for service discovery and initiation are adequate, such techniques have drawbacks. In this regard, such techniques can place an undesirable burden on mobile terminal users in discovering and initiating mobile data services. Also, such techniques can undesirably require mobile terminal users to sift through numerous network sites, advertisements, documents, etc. to locate services and information when the user is in a situation/location where there is a high probability that the user will want a certain type of information.

SUMMARY OF THE INVENTION

In light of the foregoing background, embodiments of the present invention provide an improved terminal, method and computer program product for interacting with signaling tags, such as Radio Frequency Identification (RFID) transponder tags, radio frequency transponders operating as RFID transponder tags, or the like. Embodiments of the present invention create a "point-and-click" style of user interface for ubiquitous computing applications that is based on the use of a terminal, such as a mobile station or portable digital assistant (PDA). Generally, embodiments of the present invention permit terminal users to use a terminal to select electronic tags from which the terminal can read information. Based upon the information, then, the terminal can perform predefined actions to thereby interact with a service provider via the tag. Advantageously, the terminal can be capable of actively operating an application, such as a software application, and as such, the terminal can be capable of performing the predefined action further based upon the application and the state of the application, such as being in a state of receiving or presenting data.

According to one aspect of the present invention, a terminal is provided for interacting with a service provider via a signaling tag. The terminal includes a controller capable of actively operating an application. The controller is also capable of receiving information regarding a signaling tag, such as a Radio Frequency Identification (RFID) transponder tag, at least partially over an air interface. In this regard, the information includes information relating to a service type representing a service offered by a service provider. The information relating to a service type can include a service locator representing a location of the service represented by the service type. The controller is also capable of accessing the service, such as based upon the service locator. The controller can further be capable of performing a predefined action based upon the service type, the application and the state of the application. More particularly, the controller can be capable of receiving data from the service into an actively operating application when the controller is actively operating an application in a state of receiving data. Alternatively, for example, the controller can be capable of sending data to the service from an actively operating application when the controller is actively operating an application in a state of presenting data.

The controller can be further capable of selecting a signaling tag before receiving information regarding the signaling tag. In such instances, the signaling tag can comprise a RFID transponder tag. In this regard, the terminal can also include a transceiver such that the controller is capable of selecting a signaling tag by the transceiver being passed within a predefined distance of a signaling tag. After selecting the signaling tag, the controller can then be capable of receiving the information regarding the signaling tag. For example, the controller can be capable of sending an interrogation signal to the RFID transponder tag. In response to the interrogation signal, then, the terminal can receive information regarding a signaling tag including a service type. Alternatively for example, the terminal can be capable of sending at least one interrogation signal to the RFID transponder tag, where each interrogation signal is associated with a different service type. The terminal can receive a response from the RFID transponder tag to one of the interrogation signal(s) that triggers the response. Then, the terminal can be capable of identifying a service type based upon the interrogation signal that triggers the response.

A method and computer program product for interacting with a service provider via a signaling tag are also provided. Embodiments of the present invention therefore provide a terminal, method and computer program product for interacting with service providers via signaling tags, such as RFID transponder tags and/or radio frequency transceivers. In contrast to conventional computing systems, embodiments of the present invention reduce the burden on the user of the mobile terminal in discovering and initiating interaction with a service provider. In addition, embodiments of the present invention reduce the need for the user to sift through numerous network sites, advertisements, documents, etc. to locate services offered by respective service providers. As such, the terminal, method and computer program product of embodiments of the present invention solve the problems identified by prior techniques and provide additional advantages.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
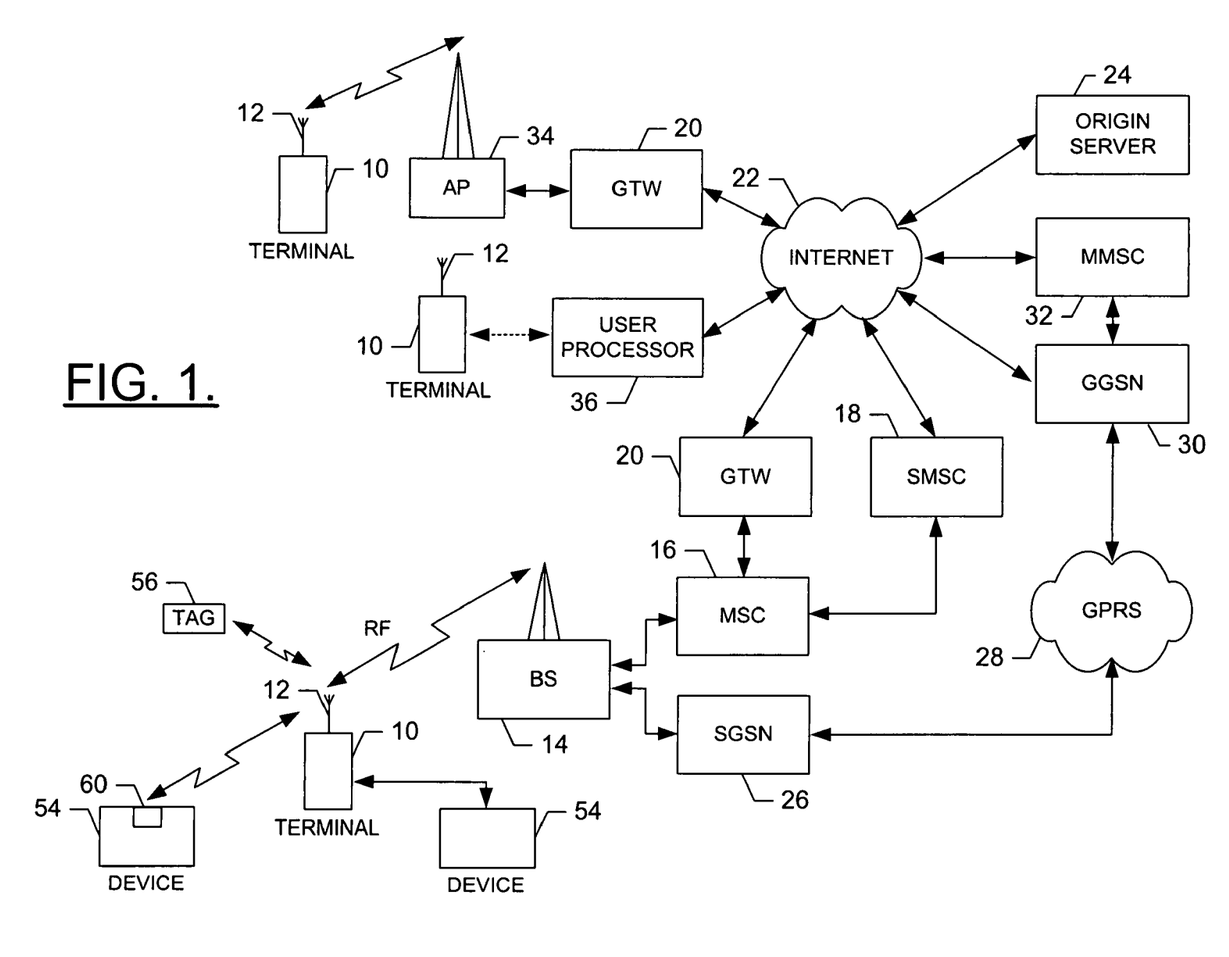
FIG. 1 is a block diagram of one type of terminal and system that would benefit from embodiments of the present invention.

Referring to FIG. 1, an illustration of one type of terminal and system that would benefit from the present invention is provided. The system, method and computer program product of embodiments of the present invention will be primarily described in conjunction with mobile communications applications. It should be understood, however, that the system, method and computer program product of embodiments of the present invention can be utilized in conjunction with a variety of other applications, both in the mobile communications industries and outside of the mobile communications industries. For example, the system, method and computer program product of embodiments of the present invention can be utilized in conjunction with wireline and/or wireless network (e.g., Internet) applications.

As shown, a terminal 10 may include an antenna 12 for transmitting signals to and for receiving signals from a base site or base station (BS) 14. The base station is a part of one or more cellular or mobile networks that each include elements required to operate the network, such as a mobile switching center (MSC) 16. As well known to those skilled in the art, the mobile network may also be referred to as a Base Station/MSC/Interworking function (BMI). In operation, the MSC is capable of routing calls to and from the terminal when the terminal is making and receiving calls. The MSC can also provide a connection to landline trunks when the terminal is involved in a call. In addition, the MSC can be capable of controlling the forwarding of messages to and from the terminal, and can also controlling the forwarding of messages for the terminal to and from a messaging center, such as short messaging service (SMS) messages to and from a SMS center (SMSC) 18.

The MSC 16 can be coupled to a data network, such as a local area network (LAN), a metropolitan area network (MAN), and/or a wide area network (WAN). The MSC can be directly coupled to the data network. In one typical embodiment, however, the MSC is coupled to a GTW 20, and the GTW is coupled to a WAN, such as the Internet 22. In turn, devices such as processing elements (e.g., personal computers, server computers or the like) can be coupled to the terminal 10 via the Internet. For example, as explained below, the processing elements can include one or more processing elements associated with an origin server 24 or the like, one of which being illustrated in FIG. 1.

The BS 14 can also be coupled to a signaling GPRS (General Packet Radio Service) support node (SGSN) 26. As known to those skilled in the art, the SGSN is typically capable of performing functions similar to the MSC 16 for packet switched services. The SGSN, like the MSC, can be coupled to a data network, such as the Internet 22. The SGSN can be directly coupled to the data network. In a more typical embodiment, however, the SGSN is coupled to a packet-switched core network, such as a GPRS core network 28. The packet-switched core network is then coupled to another GTW, such as a GTW GPRS support node (GGSN) 30, and the GGSN is coupled to the Internet. In addition to the GGSN, the packet-switched core network can also be coupled to a GTW 20. Also, the GGSN can be coupled to a messaging center, such as a multimedia messaging service (MMS) center 32. In this regard, the GGSN and the SGSN, like the MSC, can be capable of controlling the forwarding of messages, such as MMS messages. The GGSN and SGSN can also be capable of controlling the forwarding of messages for the terminal to and from the messaging center.

In addition, by coupling the SGSN 26 to the GPRS core network 28 and the GGSN 30, devices such as origin servers 24 can be coupled to the terminal 10 via the Internet 22, SGSN and GGSN. In this regard, devices such as origin servers can communicate with the terminal across the SGSN, GPRS and GGSN. By directly or indirectly connecting the terminals and the other devices (e.g., origin server) to the Internet, the terminals can communicate with the other devices and with one another, such as according to the Hypertext Transfer Protocol (HTTP), to thereby carry out various functions of the terminal.

Although not every element of every possible mobile network is shown and described herein, it should be appreciated that the terminal 10 can be coupled to one or more of any of a number of different networks through the BS 14. In this regard, the network(s) can be capable of supporting communication in accordance with any one or more of a number of first-generation (1G), second-generation (2G), 2.5G and/or third-generation (3G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The terminal 10 can further be coupled to one or more wireless access points (APs) 34. The APs can comprise access points configured to communicate with the terminal in accordance with techniques such as, for example, radio frequency (RF), Bluetooth (BT), infrared (IrDA) or any of a number of different wireless networking techniques, including WLAN techniques. Additionally, or alternatively, the terminal can be coupled to one or more user processors 36. Each user processor can comprise a computing system such as personal computers, laptop computers or the like. In this regard, the user workstations can be configured to communicate with the terminal in accordance with techniques such as, for example, RF, BT, IrDA or any of a number of different wireline or wireless communication techniques, including LAN and/or WLAN techniques. One or more of the user processors can additionally, or alternatively, include a removable memory capable of storing content, which can thereafter be transferred to the terminal.

The APs 34 and the user processors 36 may be coupled to the Internet 22. Like with the MSC 16, the APs and user processors can be directly coupled to the Internet. In one advantageous embodiment, however, the APs are indirectly coupled to the Internet via a GTW 20. As will be appreciated, by directly or indirectly connecting the terminals and the origin server 24, as well as any of a number of other devices, to the Internet, the terminals can communicate with one another, the origin server, etc., to thereby carry out various functions of the terminal, such as to transmit data, content or the like to, and/or receive content, data or the like from, the origin server. As used herein, the terms "data," "content," "information" and similar terms may be used to interchangeably to refer to data capable of being transmitted, received and/or stored in accordance with embodiments of the present invention. Thus, use of any such terms should not be taken to limit the spirit and scope of the present invention.

Figure 2:
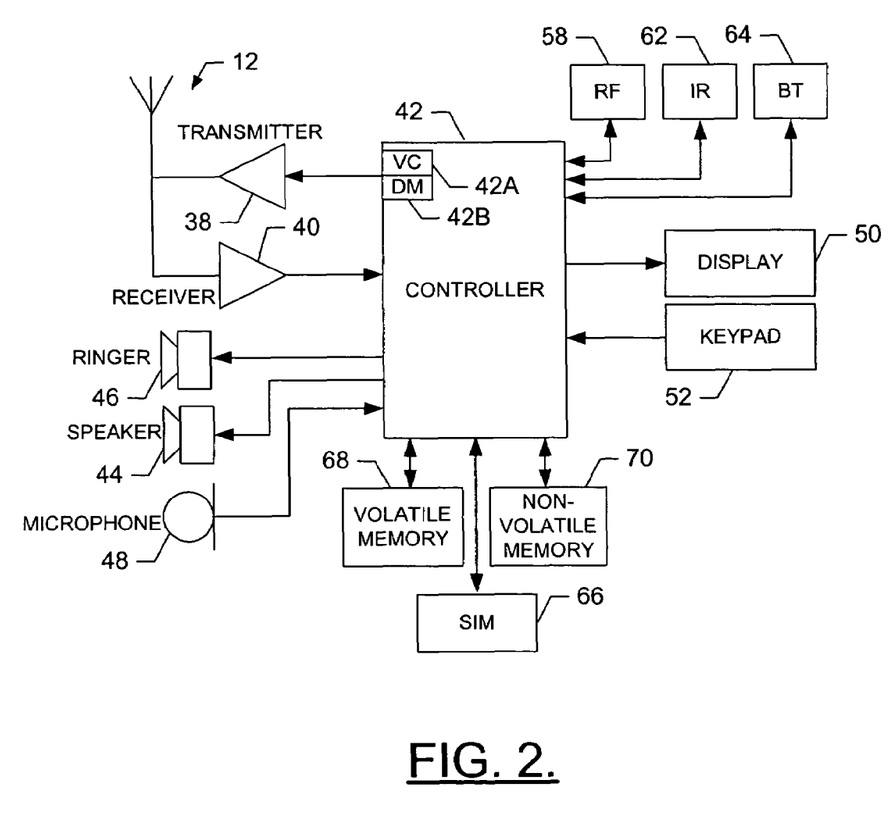
FIG. 2 is a schematic block diagram of a terminal comprising a mobile station, in accordance with one embodiment of the present invention.

Reference is now made to FIG. 2, which illustrates one type of terminal 10, a mobile station, that would benefit from embodiments of the present invention. It should be understood, however, that the mobile station illustrated and hereinafter described is merely illustrative of one type of terminal that would benefit from the present invention and, therefore, should not be taken to limit the scope of the present invention. While several embodiments of the terminal are illustrated and will be hereinafter described for purposes of example, other types of terminals, such as portable digital assistants (PDAs), pagers, laptop computers and other types of electronic systems, can readily employ the present invention.

As shown, in addition to an antenna 12, the mobile station includes a transmitter 38, a receiver 40, and a controller 42 that provides signals to and receives signals from the transmitter and receiver, respectively. These signals include signaling information in accordance with the air interface standard of the applicable cellular system, and also user speech and/or user generated data. In this regard, the mobile station can be capable of operating with one or more air interface standards, communication protocols, modulation types, and access types. More particularly, the mobile station can be capable of operating in accordance with any of a number of first generation (1G), second generation (2G), 2.5G and/or third-generation (3G) communication protocols or the like. For example, the mobile station may be capable of operating in accordance with 2G wireless communication protocols IS-136 (TDMA), GSM, and IS-95 (CDMA). Also, for example, the mobile station may be capable of operating in accordance with 2.5G wireless communication protocols GPRS, Enhanced Data GSM Environment (EDGE), or the like. Further, for example, the mobile station may be capable of operating in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, mobile terminals may also benefit from the teaching of this invention, as should dual or higher mode phones (e.g., digital/analog or TDMA/CDMA/analog phones).

It is understood that the controller 42 includes the circuitry required for implementing the audio and logic functions of the mobile station. For example, the controller may be comprised of a digital signal processor device, a microprocessor device, and various analog-to-digital converters, digital-to-analog converters, and other support circuits. The control and signal processing functions of the mobile station are allocated between these devices according to their respective capabilities. The controller can additionally include an internal voice coder (VC) 42A, and may include an internal data modem (DM) 42B. Further, the controller may include the functionally to operate one or more software programs, which may be stored in memory (described below). For example, the controller may be capable of operating a connectivity program, such as a conventional Web browser. The connectivity program may then allow the mobile station to transmit and receive Web content, such as according to the Hypertext Transfer Protocol (HTTP) and/or the Wireless Application Protocol (WAP), for example.

The mobile station also comprises a user interface including a conventional earphone or speaker 44, a ringer 46, a microphone 48, a display 50, and a user input interface, all of which are coupled to the controller 42. The user input interface, which allows the mobile station to receive data, can comprise any of a number of devices allowing the mobile station to receive data, such as a keypad 52, a touch display (not shown) or other input device. In embodiments including a keypad, the keypad includes the conventional numeric (0-9) and related keys (#, *), and other keys used for operating the mobile station. Although not shown, the mobile station can include a battery, such as a vibrating battery pack, for powering the various circuits that are required to operate the mobile station, as well as optionally providing mechanical vibration as a detectable output.

The mobile station can also include one or more means for sharing and/or obtaining data from electronic devices 54, tags 56 or the like (see FIG. 1). As will be appreciated, the electronic devices and tags can comprise any of a number of different known devices and tags capable of transmitting and/or receiving data in accordance with any of a number of different wireline and/or wireless techniques. For example, the electronic devices can comprise any of a number of different terminals 10, including other mobile stations, portable digital assistants (PDAs), pagers, laptop computers and other types of electronic systems. Likewise, for example, the tags can comprise Radio Frequency Identification (RFID) transponder tags or the like.

As shown in FIG. 2, the mobile station can include a short-range radio frequency (RF) transceiver or interrogator 58 so that data can be shared with and/or obtained from electronic devices 54 including other radio frequency transceivers (shown as 60 in FIG. 1), and/or RFID transponder tags 56. According to one embodiment of the present invention, the interrogator communicates with the tags by sending out an RF signal, which "wakes up" a transponder tag within the coverage. The tag can then transmit a signal back to the interrogator via an RF frequency signal. For more information on RFID wireless network principles, see Automatic Identification Manufacturers (AIM), *Radio Frequency Identification: A Basic Primer*, (2001), available at <http://http://www.aimglobal.org/technologies/rfid>, the contents of which are hereby incorporated by reference in its entirety. The mobile station can additionally, or alternatively, include other short-range transceivers, such as, for example an infrared (IR) transceiver 62, and/or a Bluetooth (BT) transceiver 64 operating using Bluetooth brand wireless technology developed by the Bluetooth Special Interest Group. The mobile station can therefore additionally or alternatively be capable of transmitting data to and/or receiving data from electronic devices and/or tags in accordance with such techniques. Although not shown, the mobile station can additionally or alternatively be capable of transmitting and/or receiving data from electronic devices and/or tags according to a number of different wireless networking techniques, including WLAN techniques such as IEEE 802.11 techniques or the like. Further, the mobile station can additionally or alternatively include a tag, such as an RFID transponder tag. For example, the mobile station can include a tag 56 capable of transmitting and/or receiving data in accordance with any of a number of different wireline and/or wireless techniques in accordance with embodiments of the present invention.

The mobile station can further include memory, such as a subscriber identity module (SIM) 66, a removable user identity module (R-UIM) or the like, which typically stores information elements related to a mobile subscriber. In addition to the SIM, the mobile station can include other removable and/or fixed memory. In this regard, the mobile station can include volatile memory 68, such as volatile Random Access Memory (RAM) including a cache area for the temporary storage of data. The mobile station can also include other non-volatile memory 70, which can be embedded and/or may be removable. The non-volatile memory can additionally or alternatively comprise an EEPROM, flash memory or the like. The memories can store any of a number of pieces of information, and data, used by the mobile station to implement the functions of the mobile station. The memories can also store one or more applications capable of operating on the mobile station. As explained below, the memories can further store a tag manager capable of controlling the interaction of the terminal with a service provider via a tag 56 or a transceiver 60 capable of functionally operating as a tag.

The applications capable of operating on the mobile station can comprise any of a number of different applications capable of being executed by the controller 42. For example, the applications can include one or more messaging applications, such as an E-mail application, short messaging service (SMS), multimedia messaging service (MMS) application or the like, capable of sending and receiving messages that may include data objects such as text, images, audio, video and/or other multimedia. In addition, for example, the applications can include data object presentation and/or browser applications. In this regard, the applications can include an image viewer and/or browser application. Additionally, or alternatively, the applications can include a conventional Web browser. Further, for example, the applications can include directory applications, such as directory applications capable of presenting names and associated location identifiers, such as mobile telephone numbers, landline telephone numbers, SMS numbers, pager numbers, facsimile numbers, and/or electronic mail (E-mail) addresses of a number of contacts of a user of the mobile station. The applications are typically embodied in software, but as will be appreciated, one or more applications can alternatively be embodied in firmware, hardware or the like.

In accordance with embodiments of the present invention, each tag 56 is capable of storing a number of different pieces of information capable of being read by the terminal 10. For example, each tag can store information relating to a service type. Each tag can have any of a number of different service types, each of which typically represents a service offered by a service provider associated with the respective tag. For example, one or more tags can have the service type, "Photobook," which designates the respective tag(s) as being associated with a repository offered by an imaging service provider, where the repository is capable of storing electronic images. The information relating to a service type can therefore include any of a number of pieces of information. In one embodiment, for example, the information relating to a service type includes a service locator, such as a uniform resource identifier (URI), representing a location of the service represented by the service type. For example, a tag having the service type "Photobook" can store the service locator "http://www.imagegallery.com/user/myphotos," which represents the location of the repository of electronic images.

In addition to the service locator, one or more tags 56 can further store an access identifier designating the level of access to the service represented by the service type capable of being achieved using the respective tag. For example, one or more tags can store an access identifier designating the respective tag(s) as an original tag or a copy of the original tag. In such instances, for example, the service can be configured such that a higher level of access to the service can be achieved with an original tag than a copy of the original tag. In one typical scenario where a tag has the service type "Photobook," associating the tag with a repository of electronic images, an original tag and a copy may be capable of achieving access to the repository to view images in the repository. The original tag, however, may be capable of additionally permitting a user to modify the repository, such as by adding, deleting and/or modifying images in the repository.

Briefly, in operation, the terminal 10 is capable of reading one or more pieces of information stored by a tag 56. Thereafter, the terminal is capable of performing one or more predefined actions based upon the information stored by the tag and a state of the terminal. In addition, one or more transceivers 60 (e.g., one or more radio frequency transceivers) of one or more other electronic devices 54 may each be capable of operating as a tag during operation of the method of embodiments of the present invention. For more information on such transceivers, see PCT Patent Application PCT/IB03/02900, entitled: Reader Device for Radio Frequency Identification Transponder with Transponder Functionality, filed on Jul. 22, 2003, the contents of which are hereby incorporated by reference in its entirety. As described herein, the term signaling tag can refer to a tag 56 or a transceiver 60 capable of functionally operating as a tag during operation of embodiments of the present invention.

Figure 3:
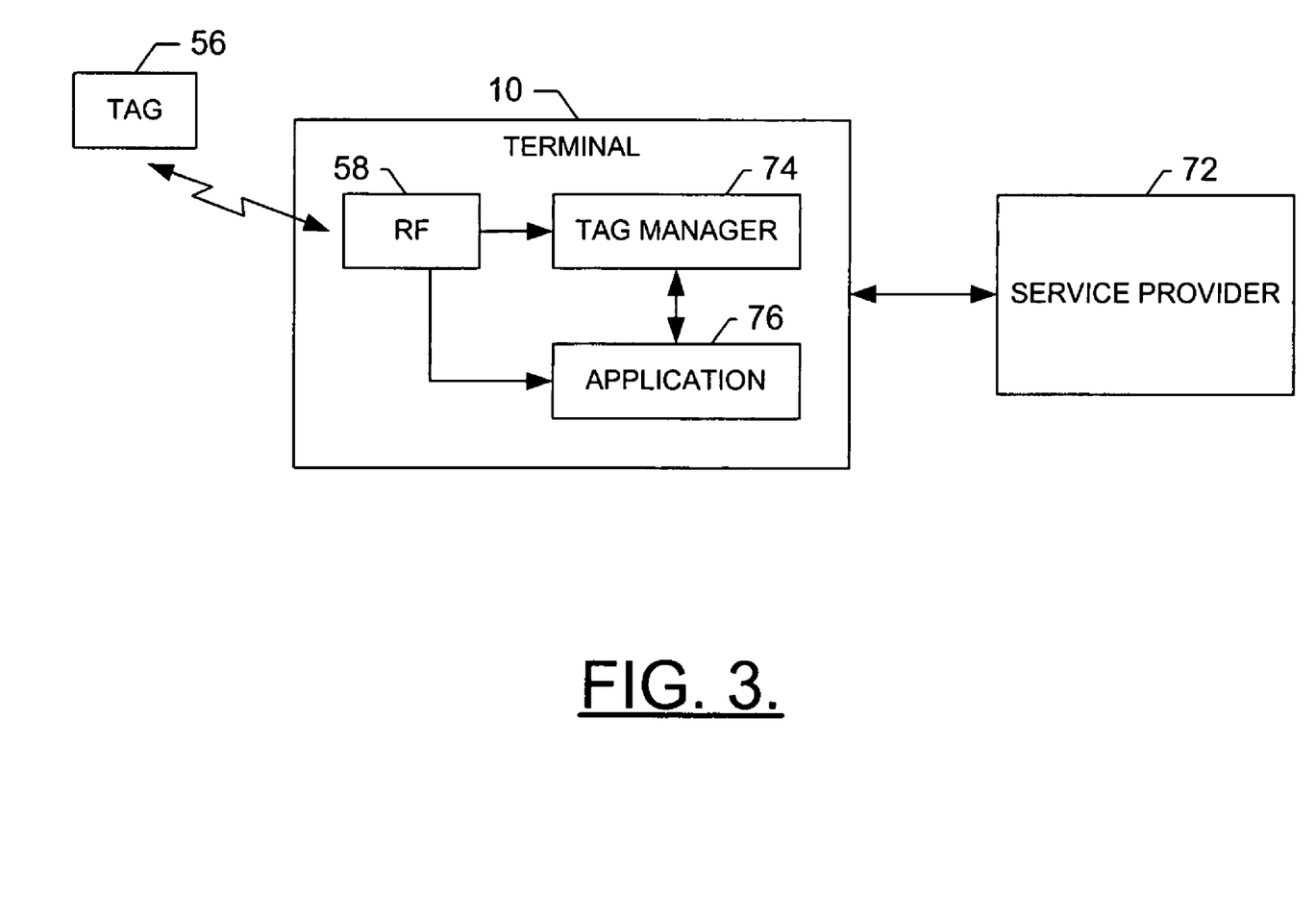
FIG. 3 is a functional block diagram of a terminal interacting with a service provider via a signaling tag, in accordance with one embodiment of the present invention.
Figure 4:
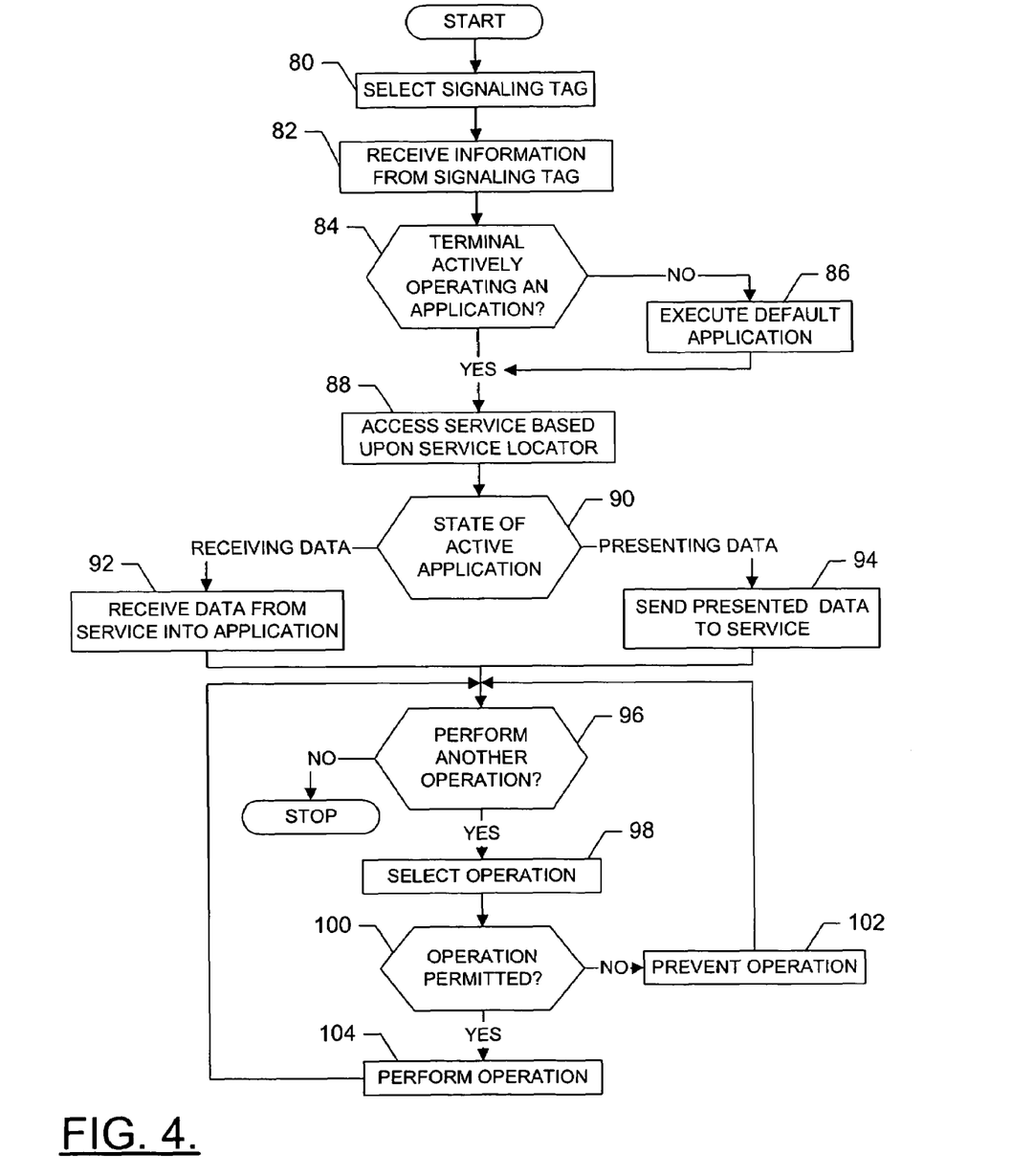
FIG. 4 is a flowchart illustrating various steps in a method of interacting with a service provider via a signaling tag in accordance with one embodiment of the present invention.

Reference is now drawn to FIGS. 3 and 4, which illustrate a functional block diagram and flowchart, respectively, of a terminal 10 and method of interacting with a service provider, in accordance with one embodiment of the present invention. More particularly, FIG. 3 illustrates a functional block diagram of a terminal interacting with a service provider 72, such as an origin server 24 or a user processor 36, via a signaling tag (e.g., tag 56), in accordance with one advantageous embodiment of the present invention. As shown and described herein, the terminal operates a tag manager 74 to control interaction of the terminal with a service provider via a signaling tag. As indicated above and described herein, the tag manager typically comprises software capable of being stored within memory (e.g., non-volatile memory 70), and operated by a processor (e.g., controller 42). It should be understood, however, that the tag manager can alternatively comprise firmware or hardware, without departing from the spirit and scope of the present invention.

As shown in FIG. 3 and block 80 of FIG. 4, the terminal 10 is capable of selecting a signaling tag, such as a tag 56 or a transceiver 60 capable of operating as a tag. Although the signaling tag can be selected in any of a number of different manners, in one embodiment, the signaling tag is selected by initiating communication with the signaling tag to thereby receive information from the signaling tag. In this regard, the terminal can initiate communication with the signaling tag in any of a number of different manners. For example, when the signaling tag comprises a RFID transponder tag 56, as shown, the terminal can initiate communication by passing the terminal, or more particularly an RF transceiver or interrogator (e.g., transceiver 58) of the terminal within a predefined distance of the RFID tag. Thereafter, the terminal can receive an instruction from a user, such as via a user interface of the terminal, to initiate communication with the signaling tag. According to embodiments of the present invention, the predefined distance between the signaling tag and the transceiver is typically short such as, for example, from substantially zero to a few centimeters. In such instances, selecting a tag may require touching the terminal to the signaling tag. After initiating communication with the signaling tag, the terminal can send a request or an interrogation signal to the signaling tag for receiving information coded in the tag, which may include, according to one embodiment of the present invention, information relating to a service type, such as a service locator and/or an access identifier of the signaling tag.

After selecting the signaling tag, the terminal 10, or more particularly the RF transceiver (e.g., transceiver 58), can receive information from the signaling tag, as shown in block 82. The terminal can receive the information in any of a number of different manners, such as via radio frequency transfer from an RFID transponder tag or a radio frequency transceiver. The terminal can directly receive the information from the signaling tag. Alternatively, the terminal can indirectly receive the information based upon the signaling tag responding to an interrogation signal from the transceiver. In such instances, the transceiver may send one or more interrogation signals to the signaling tag, with each interrogation signal associated with different information, such as a different service type. The signaling tag, then, can be configured to only respond to a particular interrogation signal. As the transceiver sends each interrogation signal to the signaling tag, the transceiver can monitor for a response from the signaling tag. When the signaling tag responds to an interrogation signal, then, the transceiver can identify the information, such as the service type, associated with the respective interrogation signal as at least a portion of the information of the signaling tag.

Irrespective of how the terminal 10 receives information from the signaling tag, after receiving the information, the terminal can perform a predefined action based upon the information and a state of the terminal. In this regard, the tag manager 74 can determine if the terminal 10 is actively operating an application, such as a data object presentation and/or browser application (e.g., image viewer/browser application), as shown in block 84. If the terminal is not actively operating an application, the tag manager can respond in any of a number of different manners. In one typical embodiment shown in block 86, for example, the tag manager can instruct the terminal to execute and thereafter operate a default application, such as a conventional Web browser or image viewer/browser application, based upon the service type of the tag. Alternatively, for example, the tag manager can prompt a user of the terminal, such as via a user interface, to select an application to execute and thereafter operate an application. In yet another alternative, the terminal can be configured to operate as described below only when an active application is operating on the terminal. In such instances, if the terminal is not actively operating an application, the tag manager can respond by ignoring the information of the signaling tag, and/or indicating to a user of the terminal that an active application is required to operate in accordance with the information of the signaling tag.

Also after receiving information from the signaling tag, the terminal 10 can access the service represented by the service type of the signaling tag. The terminal can access the service in any of a number of different manners. In one embodiment, for example, the tag manager 74 can direct the application 76 actively operating on the terminal to access the service based upon the service locator included within the information from the signaling tag, as shown in block 88. In this regard, when the actively operating application comprises an image viewer/browser application, the service locator can comprise a URI of the service such that the tag manager can direct the image viewer/browser to access the service based upon the URI. Then, if the terminal is actively operating an application in a state for receiving data, the tag manager can direct the active application to receive or otherwise download data from the service into the active application, as shown in blocks 90 and 92. For example, if the terminal is actively operating an image viewer/browser application in a state of receiving one or more images, such as into a display window, the tag manager can direct the active application to download the image(s) from the service. Alternatively, for example, if the terminal is actively operating an image/browser application in a state of receiving selection of an operation, the tag manager can direct the active application to download a portal or the like from the service such that the terminal can subsequently interact with the service based upon information provided by the portal.

If the active application is in a state of presenting data, however, the terminal can send or otherwise upload the presented data to the service, or more particularly the service provider 72, as shown in blocks 90 and 94. For example, when the active application comprises an image viewer/browser having one or more selected or displayed images, the tag manager 74 can direct the application to upload the selected or displayed images to the service provider. Thereafter, the service provider can store the images for subsequent access by the terminal, such as by again performing the above steps with the active application operating in a state of receiving data. Alternatively, for example, when the active application comprises a directory application having one or more selected contacts, the tag manager can direct the application to upload the selected contact(s) to the service provider. Thereafter, the service provider can store the selected contact(s) to thereby allow the selected contact(s) to access the service.

Irrespective of whether the active application 76 downloads data from or sends data to the service or the service provider 72, the user of the terminal 10 may desire to perform one or more additional operations with respect to the service or service provider, as shown in block 96. Thus, a user of the terminal can select an operation to perform, such as from a user interface of the actively operating application, as shown in block 98. For example, a user of the terminal may desire to delete or modify one more data objects previously sent to, and stored by, the service provider. Thus, after selecting the operation, the active application can be directed to perform the selected operation. As will be appreciated, in various instances it may be desirable for the service provider to restrict the level of access to the service represented by the service type. As such, before performing operations (and/or before sending or receiving data), the service provider may require the access identifier included within the information of the signaling tag. In such instances, the tag manager 74 can send, or direct the active application to send, the access identifier to thereby determine if the operation is permitted, as shown in block 100. Then, if the selected operation is not permitted, the service provider can prevent performance of the operation, as shown in block 102. If the operation is permitted, however, the active application can perform, and the service provider can permit performance of, the selected operation, as shown in block 104. The technique can then continue for one or more other operations, if so desired.

As an example of a typical scenario that would benefit from the system and method of embodiments of the present invention, consider a service provider 72 providing a Photobook service comprising a repository of electronic images, where the service includes uploading images to and/or downloading images from the repository. Also, consider that a subscriber to this service possesses a RFID transponder tag 56 embedded within a key chain fob, where the RFID transponder tag stores a service type comprising "Photobook," a service locator comprising "http://www.imagegallery.com/user/myphotos," and an access identifier designating the tag as an original tag of the service subscriber. In addition, consider that the subscriber has copied the contents of the tag into a number of other tags for friends and family of the subscriber. Like the original tag, the copied tags can be embedded within a number of other key chain fobs, where the copies include the information as in the original but designate the respective keys as copies of an original tag. Further, consider that the subscriber having the original tag and the friends and family having the copies each possess a terminal 10 capable of operating in accordance with embodiments of the present invention.

In various instances, presume that the subscriber, and/or one or more friends or family of the subscriber, desires to upload data objects comprising electronic images to the Photobook service for storage in a repository of electronic images of the subscriber. To upload images, the subscriber of the Photobook service can direct the terminal 10 to operate an image viewer/browser application from which the subscriber can select and/or display one or more images stored in the terminal. Before or after directing the terminal to operate the application, the terminal can access the service by selecting the RFID transponder tag 56 embedded in the key chain fob. In this regard, the subscriber can pass the terminal, or more particularly an RF transceiver or interrogator (e.g., transceiver 58) within a predefined distance of the RFID tag or radio frequency transceiver. Thereafter, the terminal can receive information coded in the tag, including the service type, service locator and access identifier of the tag. Then, after accessing the service, the tag manager 74 can direct the image viewer/browser to upload the selected and/or displayed images to the service for storage by the service provider in the repository of electronic images.

In other instances, presume that the subscriber, and/or friend(s) or family of the subscriber, desires to download electronic images from the Photobook service, or more particularly from the repository of electronic images of the subscriber. To download images, the subscriber of the Photobook service can direct the terminal 10 to operate the image viewer/browser application in a state of receiving data such as one or more images. Then, before or after directing the terminal to operate the application, the terminal can access the service by selecting the RFID transponder tag 56 embedded in the key chain fob. In this regard, the subscriber can pass the terminal, or more particularly an RF transceiver or interrogator (e.g., transceiver 58) within a predefined distance of the RFID tag or radio frequency transceiver. Again, as before, the terminal can then receive information coded in the tag. Thereafter, after accessing the service, with the image viewer/browser actively operating on the terminal in a state of receiving data, the tag manager 74 can direct the image viewer/browser to download one or more images from the service into the image viewer/browser, such as for display by the terminal.

In yet other instances, the subscriber, and/or friend(s) or family, may desire to delete and/or modify one or more images stored in the Photobook repository of images. In such instances, the respective terminal user can select an operation to perform, such as from a user interface of the image viewer/browser. After selecting the operation, but before performing the selected operation, the service provider can require the access identifier included within the information of the signaling tag. The terminal of the subscriber can thereafter send, to the service provider, the information of the signaling tag including the access identifier that provides an indication that the signaling tag selected by the subscriber is the original tag of the subscriber. The terminal(s) of the friend(s) or family, on the other hand, can send an indication that the signaling tag(s) selected by the respective friend(s) and family are copies of the original tag. Then, presuming that only the subscriber, having selected the original tag, has access to delete and/or modify images stored in the Photobook repository, the service provider can permit the terminal of the subscriber to perform such operations. On the other hand, friend(s) or family, having selected copies of the original tag, can be prevented from deleting and/or modifying such images. In this regard, friend(s) and family or any other user, having selected a copy of an original tag, can have limited access to the Photobook repository, as compared to the subscriber.

Generally, then, in various instances, data is transmitted to and/or received from a service via interaction of the terminal 10 with a tag 56 or electronic device 54 associated with the transceiver 60 operating as a tag. In such instances, selecting the signaling tag generally expresses an intent to upload and/or download data relating to a service into and/or from one or more of the actively operating application(s). More particularly, selecting a tag or transceiver operating as a tag when the terminal is actively operating an application can express an intent of the terminal to download data from a service into the actively operating application and/or upload data to the service from the actively operating application.

As described herein, upon reading information, such as a service type and a service locator, from a signaling tag, the terminal 10 can perform a predefined action based upon the information, and if the terminal is actively operating an application, further based upon the application and a state of the application. More particularly, depending upon the service type, the terminal can receive or otherwise download data from a service represented by the service type into an actively operating application when the application is in a state of receiving data, and can send or otherwise upload data to the service when the application is in a state of presenting data. It should be understood, however, that after the terminal receives information from the signaling tag, the terminal need not automatically perform the predefined action based upon the information and, if the terminal is actively operating an application, the application and state of the application. In this regard, the terminal can determine the information from the signaling tag and thereafter notify a user of the terminal (via e.g., user interface speaker 44, ringer 46 and/or display 50, and/or vibrating battery pack) that the terminal can perform one or more predefined actions based upon the information. Thereafter, the terminal can be responsive to a user selection to thereby perform a predefined action based upon the information and a user selection.

According to one aspect of the present invention, all or a portion of the system of the present invention, such all or portions of the terminal 10, generally operates under control of a computer program product. The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIG. 4 is a flowchart of methods, systems and program products according to the invention. It will be understood that each block or step of the flowchart, and combinations of blocks in the flowchart, can be implemented by computer program instructions. These computer program instructions may be loaded onto a computer or other programmable apparatus to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block(s) or step(s).

Accordingly, blocks or steps of the flowchart supports combinations of means for performing the specified functions, combinations of steps for performing the specified functions and program instruction means for performing the specified functions. It will also be understood that each block or step of the flowchart, and combinations of blocks or steps in the flowchart, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A terminal for interacting with a service provider for accessing a remote service, the terminal comprising:

a controller configured for actively operating an application, wherein the controller is configured for receiving information from a RF transponder tag or a device adapted to operate as a RF transponder tag at least partially over an air interface, wherein the information includes a service type representing a service offered by the service provider, wherein the controller is configured for contacting the service provider for accessing the service, and thereafter performing a predefined action based upon the service type, the application actively operating on the terminal, and a current state of the application when the controller receives the information, and wherein the controller is configured for alternately performing a first predefined action when the terminal is actively operating an application in a state of receiving data, and performing a second, different predefined action when the terminal is actively operating an application in a state of presenting data, the application being in a state of either receiving data or presenting data when the controller receives the information.

2. A terminal according to claim 1, wherein the first predefined action comprises receiving data from the service into an actively operating application.

3. A terminal according to claim 1, wherein the second predefined action comprises sending data to the service, the data sent to the service comprising the data presented by the application.

4. A terminal according to claim 1, wherein the controller is configured for receiving information further including a service locator representing a location of the service represented by the service type, and wherein the controller is configured for accessing the service based upon the service locator.

5. A terminal according to claim 1, wherein the controller is further configured for selecting a signaling tag before receiving information regarding the signaling tag, wherein the signaling tag comprises a Radio Frequency Identification (RFID) transponder tag.

6. A terminal according to claim 5, wherein the controller is configured for sending at least one interrogation signal to the RFID transponder tag, wherein each interrogation signal is associated with a different service type, and wherein the controller is also configured for receiving a response from the RFID transponder tag to one of the at least one interrogation signal that triggers the response, and thereafter identifying a service type based upon the interrogation signal that triggers the response.

7. A terminal according to claim 5, wherein the controller is configured for sending an interrogation signal to the RFID transponder tag, and wherein the controller is configured for receiving information from the RFID transponder tag in response to the interrogation signal.

8. A terminal according to claim 5, wherein the controller is configured for selecting a signaling tag by passing the terminal within a predefined distance of a signaling tag.

9. A terminal according to claim 1, wherein the first predefined action comprises receiving data from the service into the actively operating application, and the second predefined action comprises sending data presented by the actively operating application to the service.

10. A method of interacting with a service provider for accessing a remote service, the method comprising:
receiving information from a RF transponder tag or a device adapted to operate as a RF transponder tag at a terminal at least partially over an air interface, wherein the information includes a service type representing a service offered by the service provider;
contacting the service provider for accessing the service; and
performing a predefined action based upon the service type, an application actively operating on the terminal, and a current state of the application when the information is received,
wherein performing a predefined action comprises alternately performing a first predefined action when the terminal is actively operating an application in a state of receiving data, and performing a second, different predefined action when the terminal is actively operating an application in a state of presenting data, the application being in a state of either receiving data or presenting data when the controller receives the information.

11. A method according to claim 10, wherein performing a first predefined action comprises receiving data from the service into an actively operating application.

12. A method according to claim 10, wherein performing a second predefined action comprises sending data to the service, data sent to the service comprising the data presented by the application.

13. A method according to claim 10, wherein receiving information comprises receiving information further including a service locator representing a location of the service represented by the service type, and wherein accessing the service comprises accessing the service based upon the service locator.

14. A method according to claim 10, further comprising:
selecting a signaling tag before receiving information regarding the signaling tag, wherein the signaling tag comprises a Radio Frequency Identification (RFID) transponder tag.

15. A method according to claim 14, further comprising:
sending an interrogation signal to the RFID transponder tag, wherein receiving information regarding a signaling tag comprises receiving information from the RFID transponder tag in response to the interrogation signal.

16. A method according to claim 14, further comprising:
sending at least one interrogation signal to the RFID transponder tag, wherein each interrogation signal is associated with a different service type;
receiving a response from the RFID transponder tag to one of the at least one interrogation signal that triggers the response; and
identifying the service type based upon the interrogation signal that triggers the response.

17. A method according to claim 14, wherein selecting a signaling tag comprises passing the terminal within a predefined distance of a signaling tag.

18. A method according to claim 10, wherein the first predefined action comprises receiving data from the service into the actively operating application, and the second predefined action comprises sending data presented by the actively operating application to the service.

19. A computer readable storage medium having computer-readable program code portions stored therein, the computer-readable program code portions comprising a set of instructions for causing a computer to execute: a first executable portion for receiving information from a RF transponder tag or a device adapted to operate as a RF transponder tag at a terminal at least partially over an air interface, wherein the information includes a service type representing a service offered by the service provider; a second executable portion for contacting the service provider for accessing the service; and a third executable portion for performing a predefined action based upon the service type, an application actively operating on the terminal, and a current state of the application when the first executable portion receives the information, wherein the third executable portion is adapted to alternately perform a first predefined action when the terminal is actively operating an application in a state of receiving data, and performing a second, different predefined action when the terminal is actively operating an application in a state of presenting data, the application being in a state of either receiving data or presenting data when the controller receives the information.

20. A computer program product according to claim 19, wherein the first predefined action comprises receiving data from the service into an actively operating application.

21. A computer program product according to claim 19, wherein the second predefined action comprises sending data to the service, the data sent to the service comprising the data presented by the application.

22. A computer program product according to claim 19, wherein the first executable portion is adapted to receive information further including a service locator representing a location of the service represented by the service type, and wherein the second executable portion is adapted to access the service based upon the service locator.

23. A computer program product according to claim 19, further comprising:
a fourth executable portion for selecting a signaling tag before receiving information regarding the signaling tag, wherein the signaling tag comprises a Radio Frequency Identification (RFID) transponder tag.

24. A computer program product according to claim 23, further comprising:
a fifth executable portion for sending an interrogation signal to the RFID transponder tag, wherein the first executable portion is adapted to receive information from the RFID transponder tag in response to the interrogation signal.

25. A computer program product according to claim 23, further comprising:
a fifth executable portion for sending at least one interrogation signal to the RFJD transponder tag, wherein each interrogation signal is associated with a different service type;
a sixth executable portion for receiving a response from the RFID transponder tag to one of the at least one interrogation signal that triggers the response; and a seventh executable portion for identifying the service type based upon the interrogation signal that triggers the response.

26. A computer program product according to claim 19, wherein the first predefined action comprises receiving data from the service into the actively operating application, and the second predefined action comprises sending data presented by the actively operating application to the service.

* * * * *